(12) United States Patent
Yamamura et al.

(10) Patent No.: US 10,794,880 B2
(45) Date of Patent: Oct. 6, 2020

(54) CHROMATOGRAPH MASS SPECTROMETER

(71) Applicant: SHIMADZU CORPORATION, Kyoto-shi, Kyoto (JP)

(72) Inventors: Yutaro Yamamura, Kyoto (JP); Tohru Shiohama, Kyoto (JP); Yuji Katsuyama, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 725 days.

(21) Appl. No.: 13/781,218

(22) Filed: Feb. 28, 2013

(65) Prior Publication Data

US 2014/0244185 A1  Aug. 28, 2014

(51) Int. Cl.
*G01N 30/86* (2006.01)
*H01J 49/00* (2006.01)

(52) U.S. Cl.
CPC ..... *G01N 30/8651* (2013.01); *G01N 30/8658* (2013.01); *H01J 49/0036* (2013.01)

(58) Field of Classification Search
CPC . G01N 30/8651; G01N 30/8658; H01J 49/00; H01J 49/0036
See application file for complete search history.

(56) References Cited

U.S. PATENT DOCUMENTS 5,615,367 A * 3/1997 Bennett ............... G06F 17/3056
6,134,503 A * 10/2000 Matsumoto ........ G01N 30/8624
702/23
7,461,077 B1 * 12/2008 Greenwood .......... G06F 3/0482
7,668,870 B1 * 2/2010 Sykes ................. G06F 17/3089
707/690
8,168,942 B2   5/2012 Sumiyoshi
2009/0008542 A1   1/2009 Sumiyoshi
(Continued)

FOREIGN PATENT DOCUMENTS

JP       2003-172726 A    6/2003
WO    WO 2007/102201 A1   9/2007

OTHER PUBLICATIONS

Giarrocco et al. "Retention Time Locking: Concepts and Applications," Dec. 1997, Agilent, pp. 1-7.*

(Continued)

*Primary Examiner* — Alexander Satanovsky
*Assistant Examiner* — Liam R Casey
(74) *Attorney, Agent, or Firm* — Sughrue Mion, PLLC (57) ABSTRACT

Sequential identification numbers are automatically provided and undisplayed, constant, unique numbers are assigned to each event registered in an analysis condition setting table 100. Since correspondence information between the identification numbers and the unique numbers changes due to the reassignment of identification numbers when an event is deleted from the table, event identification numbers for each compound are changed by referring to the correspondence information on a compound information table. As a result, it is possible to avoid the misalignment of event identification numbers between both tables. In addition, when an instruction is given to coordinate the time information or m/z information on both tables, the information on one table is reflected on the other table in accordance with the identification numbers.

9 Claims, 8 Drawing Sheets

(56) References Cited

U.S. PATENT DOCUMENTS

| | | | |
|---|---|---|---|
| 2012/0072412 A1* | 3/2012 | Bestgen | G06F 16/24549 707/714 |
| 2012/0143837 A1* | 6/2012 | Roy-Faderman | G06F 16/24565 707/702 |
| 2013/0096847 A1* | 4/2013 | Yamaguchi | G01N 30/8675 702/23 |

OTHER PUBLICATIONS

Tutorials Point, SQL—Foreign Key, Nov. 2009, [retrieved on Jan. 18, 2018]. Retrieved from the Internet: < URL: https://web.archive.org/web/20091130085345/https://www.tutorialspoint.com/sql/sql-foreign-key.htm>.*

* cited by examiner

FIG. 1

| | IDENTIFICATION NO. | MEASUREMENT TIME | MASS-TO-CHARGE RATIO | | UNIQUE NO. | UNDISPLAYED PORTION |
|---|---|---|---|---|---|---|
| EVENT 1 | 1 | 0.0 - 10.0 | 100 | | A | |
| EVENT 2 | 2 | 0.0 - 10.0 | 200 | | B | |
| | | | | | | |
| | | | | | | |
| | | | | | | |

| | RETENTION TIME | MASS-TO-CHARGE RATIO | EVENT IDENTIFICATION NO. | EVENT UNIQUE NO. |
|---|---|---|---|---|
| COMPOUND a | 10.0 | 100 | 1 | A |
| COMPOUND b | 20.0 | 200 | 1 | A |
| COMPOUND c | 30.0 | 300 | 2 | B |
| | | | | |
| | | | | |

(rightmost column: UNDISPLAYED PORTION)

CHROMATOGRAPH MASS SPECTROMETER

The entire contents of Japanese Patent Publication 2012-42322 A are incorporated herein by reference.

BACKGROUND OF THE INVENTION

1. Technical Field

The present invention relates to a chromatograph mass spectrometer using a mass spectrometer as a gas chromatograph (GC) or liquid chromatograph (LC) detector. More particularly, the present invention relates to a control device for controlling the operations of analysis for obtaining analytical data or the operations of analysis for performing analytical processing on the obtained analytical data.

2. Background Art

In recent years, chromatograph mass spectrometers combining a gas chromatograph (GC) or a liquid chromatograph (LC) with a mass spectrometer (MS) have exhibited great influence in the analysis of samples containing multiple, diverse constituents. In chromatograph mass spectrometry, there are cases in which a compound to be measured is completely unknown, but when parameters such as the retention time or the mass-to-charge ratio (m/z) of a compound to be measured are known, the precision of analysis or data analysis improves. For example, if the retention time and mass-to-charge ratio of a target compound is known when analyzing a sample, data can be obtained by focusing on ions having the target mass-to-charge ratio in the vicinity of the time at which the compound is eluted from the chromatograph, and ions derived from the target compound can be detected with high sensitivity. On the other hand, if the retention time and the mass-to-charge ratio of a target compound are known when performing qualitative or quantitative determination by analyzing data collected by analysis, it is possible to find peaks originating from the target compound by performing peak detection only in the vicinity of the retention time in the chromatogram (extracted ion chromatogram) with respect to the mass-to-charge ratio, which makes it possible to obtain highly reliable analysis results.

When the retention time or the mass-to-charge ratio of a compound to be measured is known at the time of analysis, as described above, or when the compound itself is unknown but it is possible to narrow down the time range or the mass-to-charge ratio to be measured, an SIM (Selected Ion Monitoring) measurement mode is ordinarily used as the measurement mode of the mass spectrometer. For example, when performing SIM measurements with the chromatograph mass spectrometer described in Patent Literature 1, an SIM measurement condition table for describing the measurement time range and the mass-to-charge ratio to be measured in association with one another is displayed on a display screen, and an analyst inputs the time range and the mass-to-charge ratio to be measured in advance. On the other hand, when executing data analysis for a target compound, a compound information table for coordinating each compound and describing information such as the retention time or the mass-to-charge ratio is displayed on the display screen, and the analyst inputs the name of the compound to be analyzed or compound information in advance (see FIG. 3 of Patent Literature 1).

The analysis operation for collecting data for a sample and the data analysis operation for performing analytical processing on collected data are basically separate operations, and the analyst must independently set the parameters for analysis and the parameters for data analysis. However, in actuality, it is often the case that it is desirable to use the same parameters as the parameters for analysis and the parameters for data analysis when collecting mass spectrometry data using a known compound as the compound to be measured and performing analysis on the collected data. In the case of a configuration in which parameters are set in separate tables comprising a SIM measurement condition table and a compound information table, as described above, it is necessary to perform an input operation for the same parameters in the two tables even when the parameters for analysis and for data analysis should be the same, which is troublesome and time-consuming.

In order to reduce such trouble, the device described in Patent Literature 1 has a function for automatically creating an SIM condition setting table from a compound information table. As a result, the parameters for analysis and the parameters for data analysis initially match. However, when an analyst makes some kind of change to conditions such as changing the parameters in the SIM measurement condition table, such changes are not reflected in the parameters for data analysis in the compound information table, so the analyst must add the same changes in the compound information table, which is troublesome. Moreover, if the analyst forgets to perform this operation, the analyst will mistakenly interpret the parameters for analysis and the parameters for data analysis as matching one another in spite of the fact that the parameters do not in fact match, which may lead to inappropriate results.

PRIOR ART LITERATURES (PATENT LITERATURE 1) Japanese Unexamined Patent Application Publication 2003-172726

SUMMARY OF THE INVENTION

The present invention was conceived in light of the problems described above, and its purpose is to make it possible to independently set and change values when setting analysis conditions and when setting data analysis conditions for parameters required for both analysis and data analysis such as the retention time or the mass-to-charge ratio in a chromatograph mass spectrometer and to make the parameters for analysis and the parameters for data analysis common to one another with a simple operation as necessary—that is, to align one with the other.

The present invention, which was conceived in order to solve the problems described above, is a chromatograph mass spectrometer equipped with a chromatograph part for temporally separating various constituents in a sample, a mass spectrometry part for executing mass spectrometry on the constituents separated by the chromatograph part, a data processing part for performing analytical processing on data collected by the mass spectrometry part, and a control part for operating the mass spectrometry part in a measurement mode which selectively performs mass spectrometry on ions having a specific mass-to-charge ratio over a specific time range, wherein the chromatograph mass spectrometer is provided with:

a) a display control means for simultaneously or separately displaying the following tables on the screen of a display part:

a first table for analysis condition setting in which one or a plurality of events are described in a table format in units of events including one measurement time range of the measurement mode, one or a plurality of mass-to-charge ratios to be measured within the time range, and identification numbers as information; and a second table for analysis condition setting in which the retention time, the mass-to-charge ratio, and the identification number for designating the event to be used at the time of analysis are described in a table format for each compound to be analyzed by the data processing part;

b) an identification number management means which produces the identification number for each event registered in the first table so as to form sequential numbers in the table and inserts the numbers into the identification number column of the first table;

c) a coordination instruction means with which an analyst gives an instruction to coordinate at least either the measurement time ranges in the first table and the retention times in the second table or the mass-to-charge ratios in the first table and the mass-to-charge ratios in the second table; and d) a coordination control means which, when coordination is instructed by the coordination instruction means, coordinates the events in the first table with the compounds in the second table using the identification numbers and modifies the measurement time ranges, retention times, or mass-to-charge ratios in one table in accordance with the measurement time ranges, retention times, or mass-to-charge ratios in the other table.

"A measurement mode which selectively performs mass spectrometry on ions having a specific mass-to-charge ratio over a specific time range" is typically an SIM measurement mode, but it may also be an MRM (Multiple Reaction Monitoring) measurement mode if the mass spectrometry part has an MS/MS-type configuration, as in the case of a triple quadrupole mass spectrometer.

The analyst inputs and sets analysis conditions—that is, parameters to be used at the time of analysis—in the state in which the first table is displayed on the display screen and inputs and sets data analysis conditions—that is, parameters to be used at the time of data analysis—in the state in which the second table is displayed on the display screen. The first table has an identification number column showing events including the measurement time range and the mass-to-charge ratio to be measured within that time range as information and identification numbers corresponding to the events, but the identification numbers are not provided by the analyst and are rather provided automatically by the identification number management means so that the identification numbers for events registered in the first able are always sequential numbers. On the other hand, the second table also has a column showing the identification number corresponding to each compound, but the analyst manually enters events to be used when analyzing the compound into this column.

For example, when the analyst wishes to set the measurement time range of each event in the first table so as to correspond to the retention time of each compound in the second table, the analyst gives an instruction with the coordination instruction means to coordinate the retention times in the second table with the measurement time ranges in the first table. As a result, the coordination control means coordinates the events in the first table with the compounds in the second table using the identification numbers and appropriately changes the measurement time ranges so that the measurement time range for a given event includes the retention time of the compound (not limited to a single compound) to which the same identification number is assigned. Accordingly, even if the measurement time range is not inputted and set appropriately when an event is registered, it is possible to automatically set the measurement time range for the event by aligning it with the retention time of the compound from the side of the compound to be analyzed using the event.

With the chromatograph mass spectrometer of the present invention, it is possible to independently set parameters for analysis and parameters for data analysis, and it is also possible to cause the retention time of a compound to be reflected in the measurement time range of an event at an arbitrary timing or, conversely, to cause the mass-to-charge ratio of the event to be reflected in the mass-to-charge ratio of the compound when required by the analyst. In addition, the operation for coordinating the parameters for analysis and the parameters for data analysis in this way is extremely simple, so the burden of the analyst is dramatically reduced in comparison to cases in which the parameters for analysis and for data analysis are changed separately, and this makes it possible to avoid operational mistakes such as mistaken input. Of course, if such coordination of the parameters for analysis and the parameters for data analysis is unnecessary, it is also possible to opt not to coordinate the parameters.

As one mode for carrying out the chromatograph mass spectrometer of the present invention, the coordination control means may be configured so that when an instruction is given to coordinate the measurement times in the first and second tables, the coordination control means defines a time range in which a prescribed time range is set based on the retention time set for each compound in the second table and sets this as the measurement time range of each event in the first table.

The prescribed time range described above may be set to a fixed value in advance by the manufacturer at the point in time when the device is shipped, or it may be set to an arbitrary value by the user at a later time. In either case, the measurement time range can be defined automatically so that the target compound can be detected with certainty by appropriately setting the time range while taking into consideration variation in elution time caused by variation in the separation conditions (for example, the linear velocity of the mobile phase) in the chromatograph part.

As a more preferable mode of the chromatograph mass spectrometer of the present invention, the identification number management means may be configured so as to provide the events with undisplayed, constant, unique numbers when the events are newly registered in the first able and, when changes occur in the identification numbers for events in the first table, to update the identification number for the compounds in the second table based on the unique numbers associated with the events.

As described above, since the identification numbers are assigned so as to always be sequential numbers in the first table, it is possible that when some registered events are deleted, for example, the identification numbers of the remaining events may be reassigned. Therefore, the coordination between the events and the identification numbers is one-to-one but not constant. In contrast, the unique numbers do not change once they are assigned to events, and the event corresponding to a given unique number is determined uniquely. Therefore, by coordinating the events in the first table with the compounds in the second table via undisplayed (not appearing on the display screen), unique numbers and managing the relationships between the unique numbers and the identification numbers, when the identification number of a given event changes due to reassignment, it is possible to quickly and reliably change the identification number of the compound corresponding to the unique number of the event in accordance with the change. As a result, the corresponding relationships between the identification number of the event in the first table and the identification number of the compound in the second table can always be maintained.

EXEMPLARY EMBODIMENTS OF THE INVENTION

Figure 1:
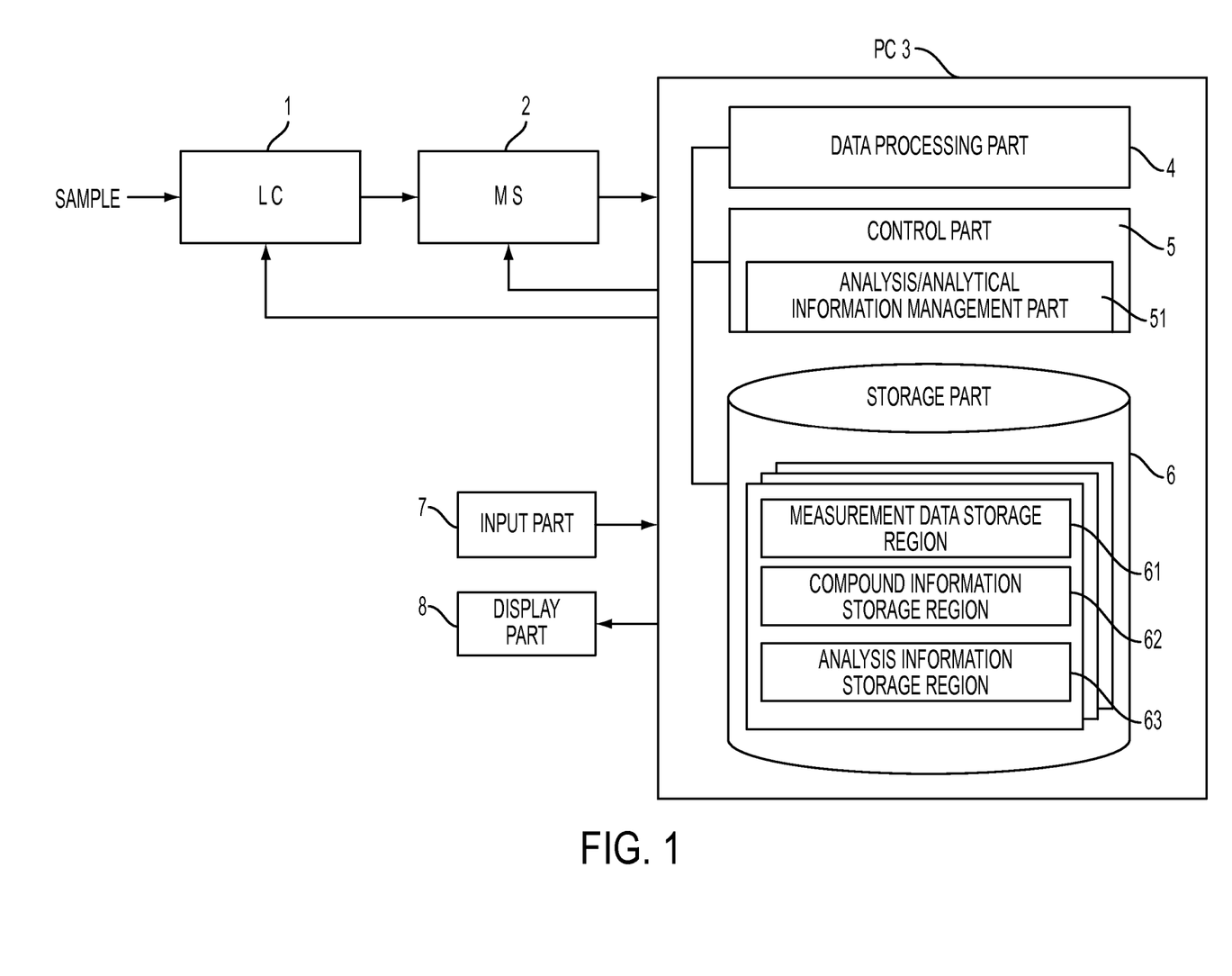
FIG. 1 is a schematic configuration diagram of an LC-MS system serving as an embodiment of the present invention.

An LC-MS system serving as an embodiment of the chromatograph mass spectrometer of the present invention will be described hereinafter with reference to the attached drawings. FIG. 1 is a schematic configuration diagram of the LC-MS system of this embodiment.

This system is provided with a liquid chromatograph (LC) 1 for temporally separating various constituents contained in a liquid sample, a mass spectrometer (MS) 2 for separating and detecting each of the separated constituents in accordance with the mass-to-charge ratio m/z, and a personal computer (PC) 3 for processing data collected by the MS 2 and controlling the operation of the MS 2. An input part 7 which is a keyboard or a pointing device such as a mouse and a display device 8 are connected to the PC 3. Specialized data processing/control software is installed on the PC 3, and executing this software with the PC 3 realizes a functional block including a data processing part 4, a control part 5, a storage part 6, and the like. The control part 5 includes an analysis/analytical information management part 51 for executing control operations characteristic to the present invention described below. The storage part 6 has storage regions such as a measurement data storage region 61, a compound information storage region 62, and an analysis information storage region 63 as regions for collecting and storing various data for a single sample.

The MS 2 of the system of this embodiment is a quadrupole mass spectrometer using a quadrupole mass filter as a mass spectrometer, but various mass spectrometers may be used as long as the mass spectrometer is capable of performing mass spectrometry on ions having one or a plurality of designated mass-to-charge ratios.

The basic operation for executing LC/MS analysis of a target sample with the LC-MS system of this embodiment is as follows.

When a target sample is introduced into the LC 1 under the control of the control part 5, various constituents (compounds) contained in the target sample are separated as they pass through the LC 1, and they are then eluted from the LC 1 and introduced into the MS 2 with a time difference. In the MS 2, which is a quadrupole mass spectrometer, SIM measurements for performing only mass spectrometry on ions having one or a plurality of specific mass-to-charge ratios or scan measurements for performing a mass scan over a prescribed mass-to-charge ratio range and performing mass spectrometry on all ions during this time can be selectively repeated appropriately.

When the types of compounds contained in a target sample are known or when compounds to be measured in the target sample are determined in advance, it is appropriate to perform SIM measurements in which the mass-to-charge ratios of compounds to be measured are set. In this case, when a compound to be measured is eluted from the LC 1 and introduced into the MS 2, ions originating from the compound selectively pass through the quadrupole mass filter and reach the detector. As a result, detection data having an intensity corresponding to the content of the compound is outputted from the MS 2, uploaded to the PC 3, and stored in the measurement data storage region 61.

When the compounds contained in the target sample are unknown or when compounds are to be comprehensively investigated without focusing on specific compounds, scan measurements are performed rather than SIM measurements in the MS 2. In scan measurements, detection data is outputted from the MS 2 at the point in time when there are ions having the mass-to-charge ratio in question in the process of repeating mass scans. In the data processing part 4, a mass spectrum over the mass-to-charge ratio range can be created corresponding to a single mass scan, so mass spectra are repeatedly obtained as time elapses, and the data constituting the mass spectra are stored in the measurement data storage region 61.

When there is a desire to perform a qualitative determination of compounds in a given target sample after data for the sample is collected as described above and the analyst gives a prescribed instruction from the input part 7, the data processing part 4 creates an extraction ion chromatogram (mass chromatogram) by reading out data showing temporal changes in the signal intensities of the mass-to-charge ratios of the target compounds from the measurement data storage region 61. Peaks are then detected in the vicinities of the retention times of the target compounds in the chromatogram, and the peak areas are calculated, for example, so that assay values may be calculated from the area values.

In the LC-MS system of this embodiment, when executing LC/MS analysis for a given sample as described above and collecting data, it is necessary to set conditions such as the measurement time range or the mass-to-charge ratio in the case of SIM measurements, for example, and conditions such as the measurement time range, the mass-to-charge ratio range, or the scan speed (or the time of a single scan or the number of repetitions of scans within a unit time) prior to analysis. In addition, when performing data analysis such as quantitative or qualitative determination using data obtained by analysis as described above, it is necessary to set compound information such as the retention time or the mass-to-charge ratio of the compounds to be analyzed prior to data analysis. In the LC-MS system of this embodiment, a analysis condition setting table in which analysis conditions are to be set by the analyst and a compound information table for setting compound information are respectively prepared, and when the analyst respectively performs prescribed operations with the input part 7, the analysis/analytical information management part 51 displays the analysis condition setting table and the compound information table on the screen of the display device 8. Both tables may be displayed on the screen simultaneously or may be displayed on different screens at different times.

Figure 2:
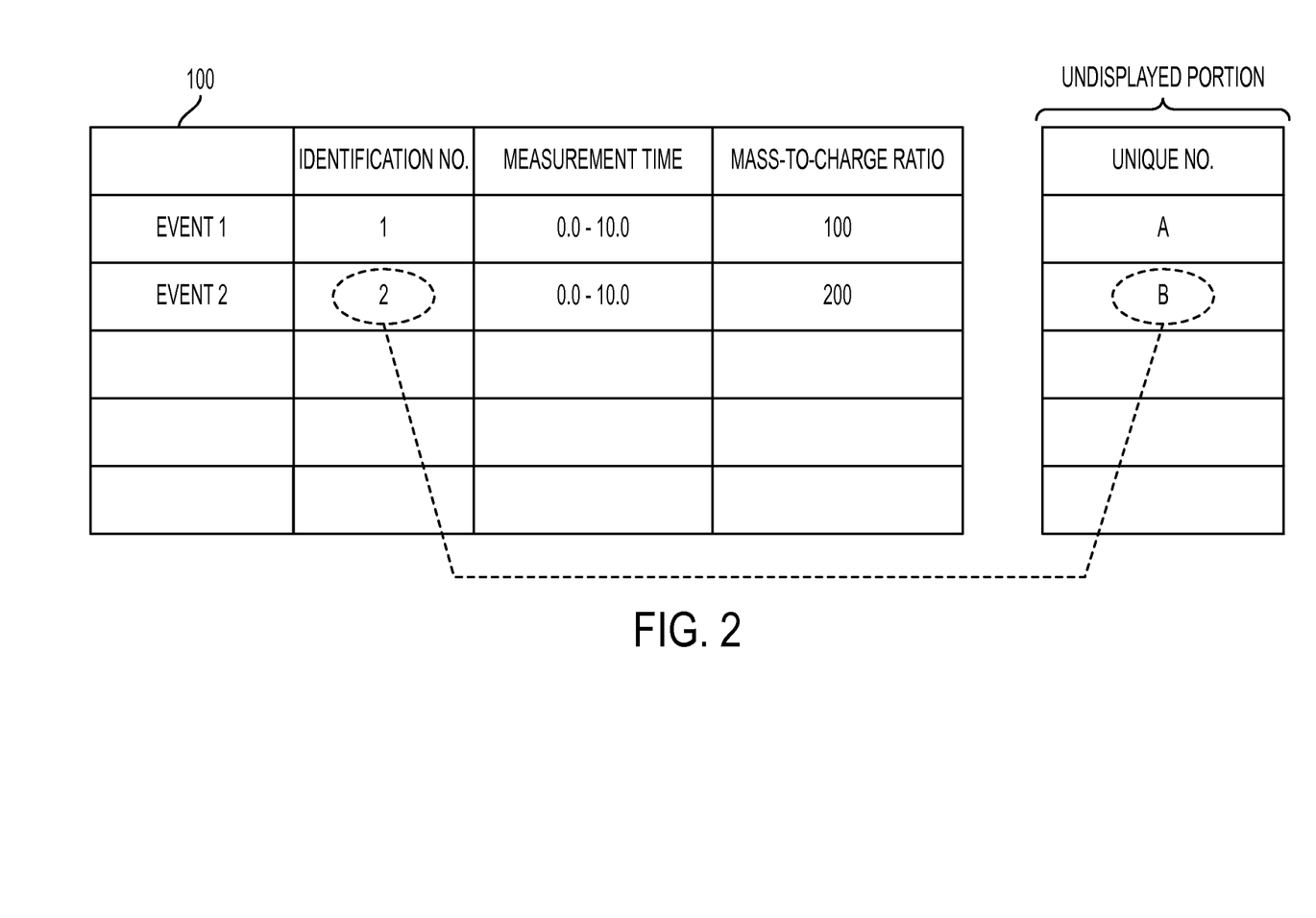
FIG. 2 is a schematic diagram showing an example of an analysis condition setting table in the LC-MS system of this embodiment.
Figure 3:
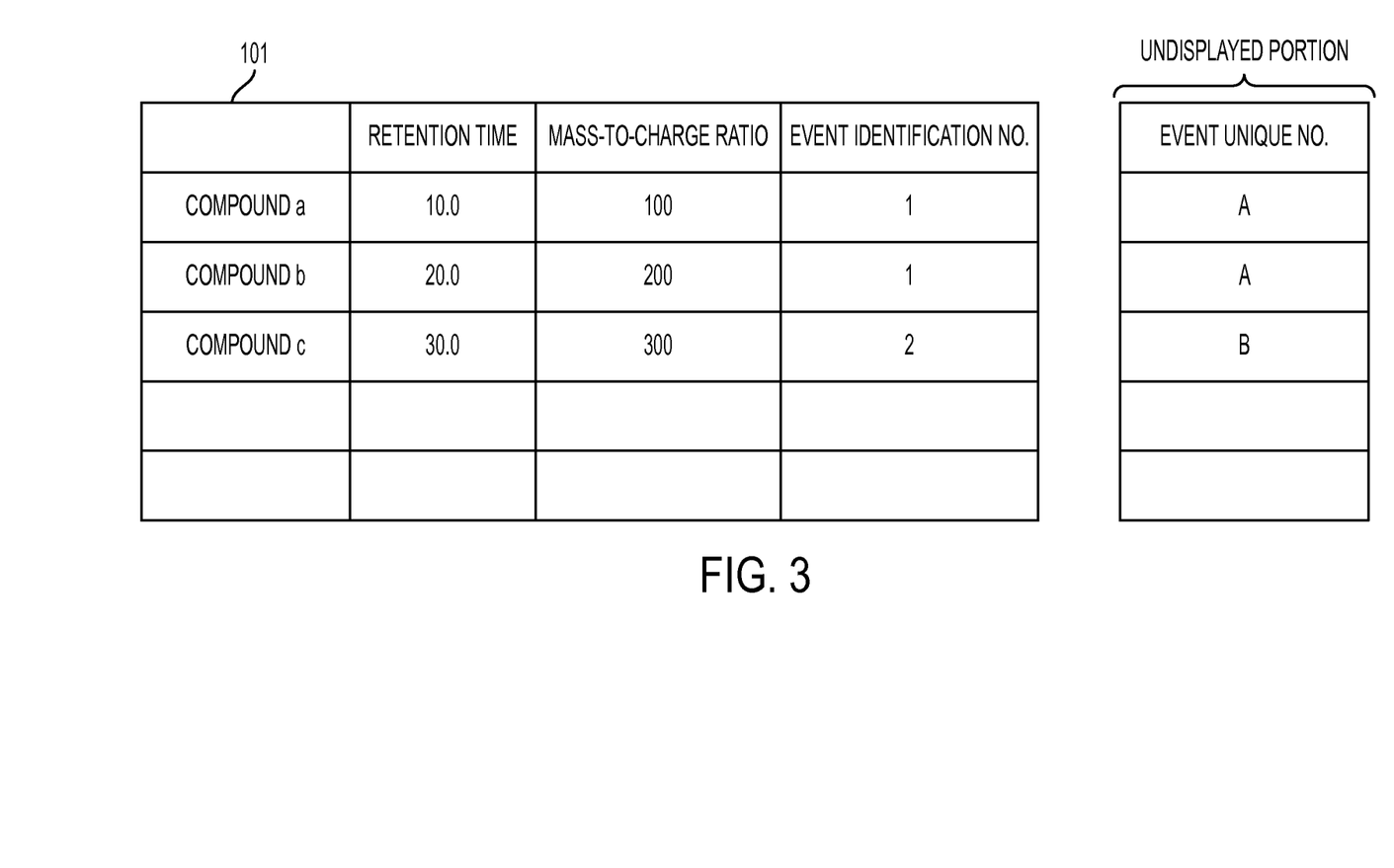
FIG. 3 is a schematic diagram showing an example of a compound information table for data analysis in the LC-MS system of this embodiment.

FIG. 2 shows an example of the analysis condition setting table stored in the analysis information storage region 63, and FIG. 3 shows an example of the compound information table stored in the compound information storage region 62. In the analysis condition setting table 100, analysis conditions are set in units of events. FIG. 2 shows events for SIM measurements, and the measurement time range, the mass-to-charge ratio to be measured, and the like are set for each event. Here, two events (event 1 and event 2) are registered in the analysis condition setting table 100, but more events may also be registered. In addition to events for SIM measurements, events for scan measurements may also be mixed into the analysis condition setting table 100.

In each event, the columns of the measurement time range and the mass-to-charge ratio are columns in which the analyst can arbitrarily input or change numerical values with the input part 7, but the identification number column is a column which does not allow manual input and is a column in which, as described below, sequential identification numbers assigned automatically by the analysis/analytical information management part 51 are set in response to editing operations such as the new registration or deletion of events. In FIG. 2, only one type of mass-to-charge ratio is set for a single event, but up to 32 types of mass-to-charge ratios can be set. That is, the MS 2 of the system of this embodiment can simultaneously execute SIM measurements for 32 different mass-to-charge ratios (strictly speaking, in time series rather than simultaneously).

The retention time, the mass-to-charge ratio, the event identification number, and the like are set for each compound name in the compound information table 101 shown in FIG. 3. In the example of FIG. 3, three compounds (compounds a, b and c) are registered. For each compound, the columns of the retention time and the mass-to-charge ratio are columns in which the analyst can arbitrarily input or change numerical values with the input part 7. In the compound information table 101, in contrast to the analysis condition setting table 100, numerical values can be arbitrarily inputted into the identification number column using the input part 7. Basically, in order to newly register a compound in the compound information table 101, the analyst also inputs the event identification number manually. At this time, the same event identification number can be assigned to a plurality of compounds. This is because a plurality of compounds could conceivably be analyzed with a single event. In the example of FIG. 3, the same event identification number "1" is set for compounds a and b. This means that compounds a and b are analyzed under the conditions of the event to which the event identification number "1" is assigned.

Figure 4:
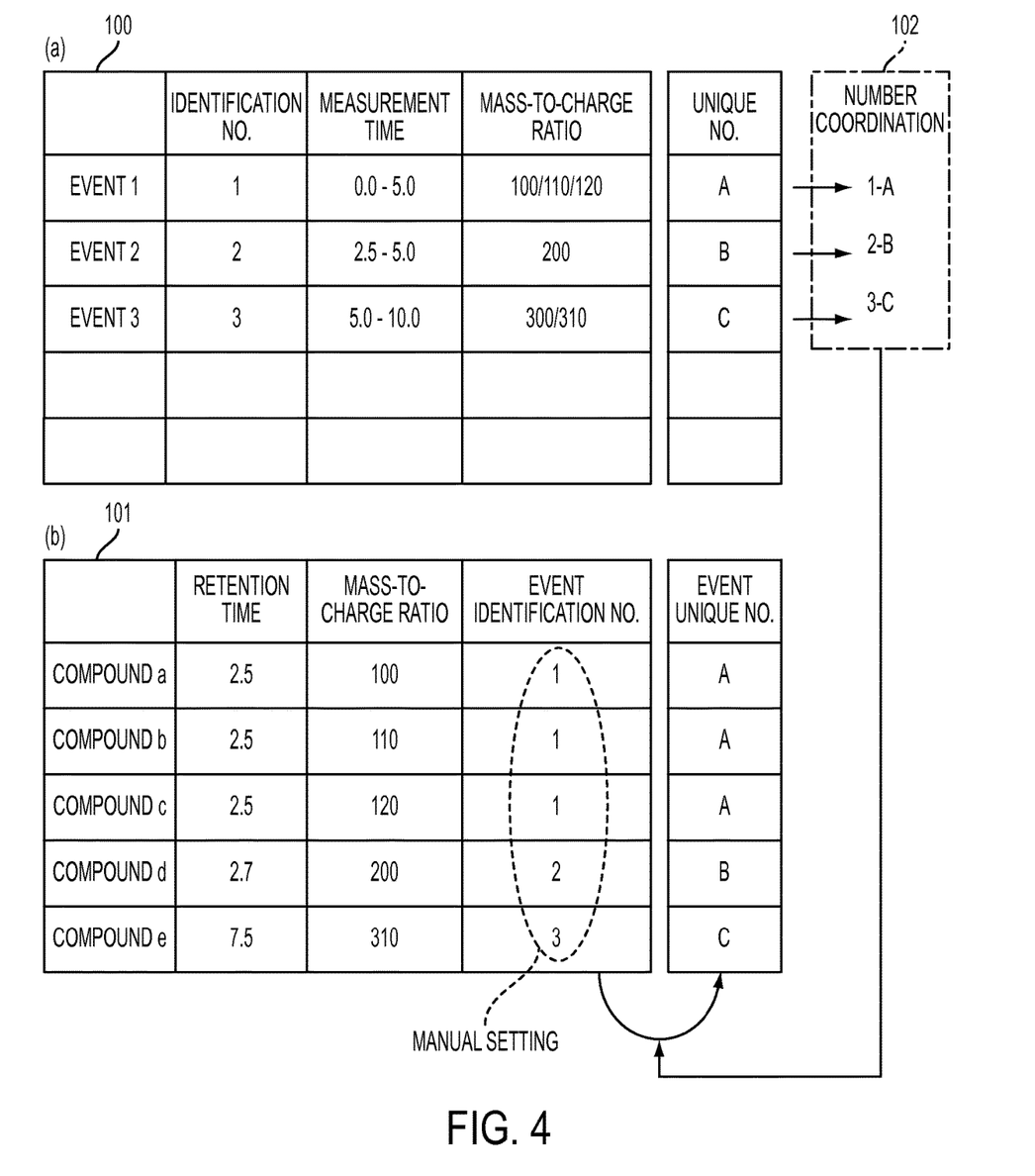
FIG. 4 is a schematic diagram for explaining the relationship between identification numbers and unique numbers in the analysis condition setting table and the compound information table.

In addition to the identification number appearing on the display, a unique number which does not appear on the display is provided for each event registered in the analysis condition setting table 100. That is, in addition to the analysis condition setting table 100, a list of unique numbers shown on the right side of FIG. 2 are stored as pairs with this information in the analysis information storage region 63. Similarly, in addition to the compound information table 101, a list of unique numbers shown on the right side of FIG. 3 are stored as pairs with this information in the compound information storage region 62. Next, the identification numbers and unique numbers which are set and managed by the analysis/analytical information management part 51 will be described in detail using FIG. 4. FIGS. 4 (*a*) and (*b*) are different examples of the analysis condition setting table 100 and the compound information table 101.

For example, when the analyst newly registers an event as shown in FIG. 4 (*a*) from a state in which the analysis condition setting table 100 is completely empty, the analysis/analytical information management part 51 automatically assigns identification numbers consisting of sequential numbers starting with "1" for all of the events registered in the analysis condition setting table 100. In the example of FIG. 4 (*a*), identification numbers "1" to "3" are assigned for three events, and this is displayed in the identification number column, as shown in the drawing. As described above, this number cannot be changed manually and is automatically updated in accordance with the addition or deletion of new events. That is, it is ensured that the identification numbers are always sequential numbers beginning with "1" in the analysis condition setting table 100. The analysis/analytical information management part 51 automatically assigns non-duplicating unique numbers which are separate from the identification numbers for all events newly registered in the analysis condition setting table 100. In the example of FIG. 4 (*a*), unique numbers "A," "B," and "C" are assigned for three events, and information 102 showing the corresponding relationships between the identification numbers and the unique numbers at that point in time is recorded. As described above, whereas the identification numbers are not unique to events since they are updated automatically, the unique numbers are constant numbers which are not changed once they are provided and are literally unique to the events.

On the other hand, as shown in FIG. 4 (*b*), the analyst inputs and sets compounds, retention times, and mass-to-charge ratios in the compound information table 101 and further inputs and sets event identification numbers for each compound. In the example of FIG. 4 (*b*), the same event identification number "1" is set for the three compounds a, b, and c. When the event identification numbers inputted into the compound information table 101 are determined, the analysis/analytical information management part 51 finds a unique number corresponding to the identification number of each compound using the information 102 showing the corresponding relationships between the identification numbers and the unique numbers, creates a list of unique event numbers shown on the right side of FIG. 4 (*b*), and stores the list in the compound information storage region 62 together with the compound information table 101.

Figure 5:
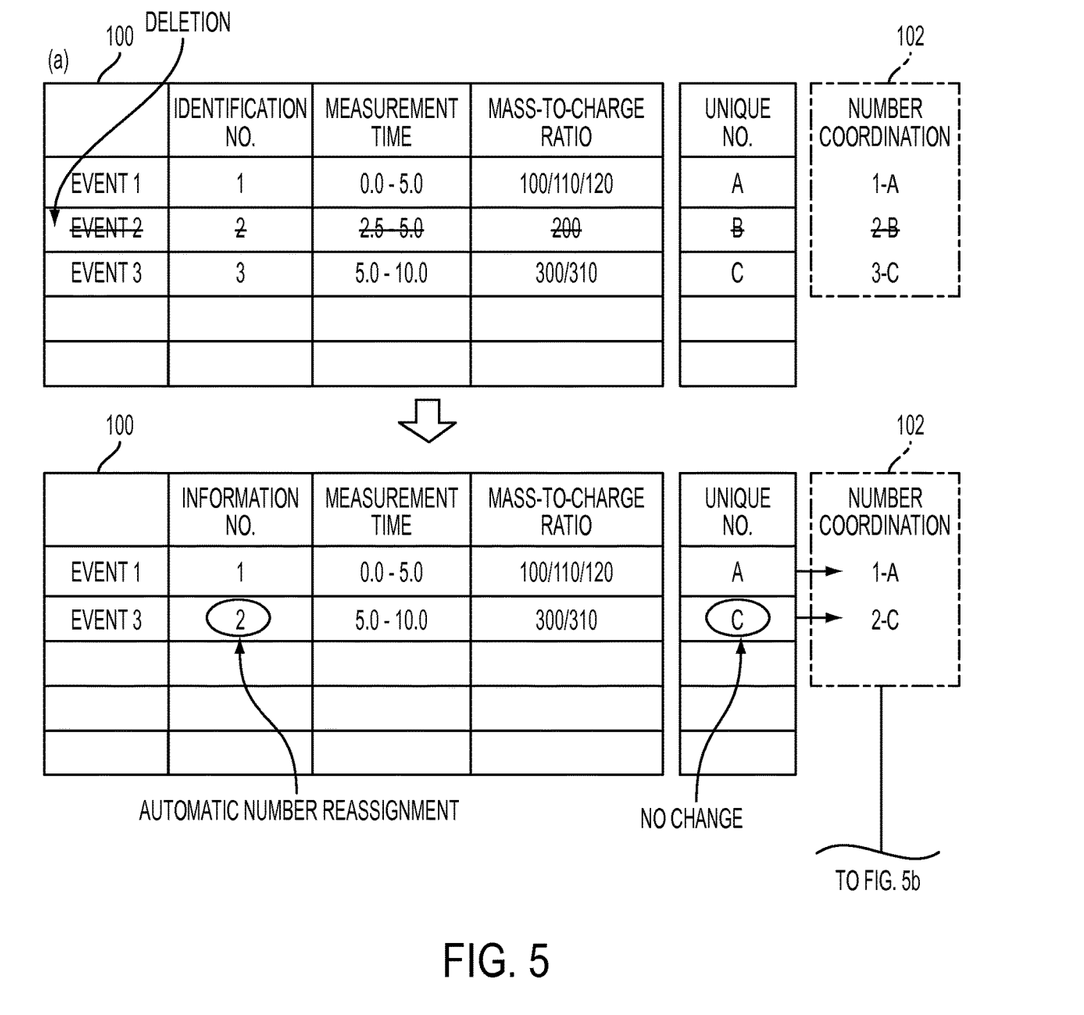
FIG. 5 is a schematic diagram for explaining changes in the content of the analysis condition setting table resulting from the editing operation of the table and changes in the content of the compound information table.

Next, the processing operation for changing the content of the compound information table 101 shown in FIG. 4 (*a*) in order to change the analysis conditions will be described. As shown in FIG. 5 (*a*), the analysts give an instruction with the input part 7 to delete event 2 in the analysis condition setting table 100. After receiving this instruction, the analysis/analytical information management part 51 deletes the second line (the line of event 2) in the analysis condition setting table 100 and moves the third line up. Since the identification numbers must maintain the form of sequential numbers in the analysis condition setting table 100, as described above, the analysis/analytical information management part 51 executes an automatic reassignment of the identification numbers and updates the identification number "3," which had been provided for event 3 prior to the deletion, to "2." On the other hand, since the unique numbers are never reassigned, the unique number corresponding to event 3 is still "C." Accordingly, the reassignment of the identification numbers causes the information 102 showing the corresponding relationships between the identification numbers and the unique numbers to be changed.

On the other hand, in order to secure consistency with the reassignment of the identification numbers accompanying the change in the analysis conditions described above, the analysis/analytical information management part 51 also automatically changes the event identification numbers in the compound information table 101. That is, since the information 102 showing the corresponding relationships between the identification numbers and the unique numbers are changed as a result of the reassignment of the identification numbers, as described above, the analysis/analytical information management part 51 references the information 102 to search for corresponding identification numbers from the unique numbers and changes the event identification numbers. In the example of FIG. 5 (b), the event unique number for compound e is "C," the identification number corresponding to the unique number "C" changes to "2" from the information 102 showing the corresponding relationships between the identification numbers and the unique numbers, so the event identification number "3" for compound e is changed to "2." When event 2 is deleted from the analysis condition setting table 100, the corresponding relationship of the unique number "B" which had been associated with the event is eliminated, so a provisional event identification number is provided for compound d in accordance with a predetermined algorithm. For example, in this example, the largest number lower than the event identification number prior to elimination is used as a provisional number, and "1," which is the largest number lower than the event identification number "2," is used as the provisional number. However, in order to make it visually clear that the number is a provisional number, the number may be displayed in a different color than that of the determined event numbers or displayed in a blinking manner, for example. In addition, the analyst may temporarily reset the numbers manually as an empty column.

As described above, with the LC-MS of this embodiment, unique numbers which are constant regardless of the addition or deletion of events are assigned to the events registered in the analysis condition setting table 100 separately from the sequential identification numbers, and the unique numbers are used to change the event numbers in the compound information table 101 so as to match the identification numbers in the analysis condition setting table 100. As a result, the automatic change of identification numbers resulting from the addition or deletion of events in the analysis condition setting table 100 by the analyst is quickly reflected in the compound information table 101, which makes it possible to avoid misalignment (inconsistency) in the identification numbers of both tables 100 and 101.

As described above, the analysis condition setting table 100 is used to set analysis conditions, and the compound information table 101 is primarily used to set parameters for data analysis at the time of qualitative or quantitative determination, but in order to collect data for specific compounds by SIM measurements and to perform qualitative determinations of the compounds by analyzing the data, it is important for the time information or the mass-to-charge ratio information in both tables 100 and 101 to match. Therefore, it is desirable to be able to cause the time information or the mass-to-charge ratio information in one table to be reflected in the other table with a simple operation. Thus, in the LC-MS system of this embodiment, the analysis/analytical information management part 51 has a function for coordinating the time information or the mass-to-charge ratio information of both of the tables 100 and 101.

Figure 6:
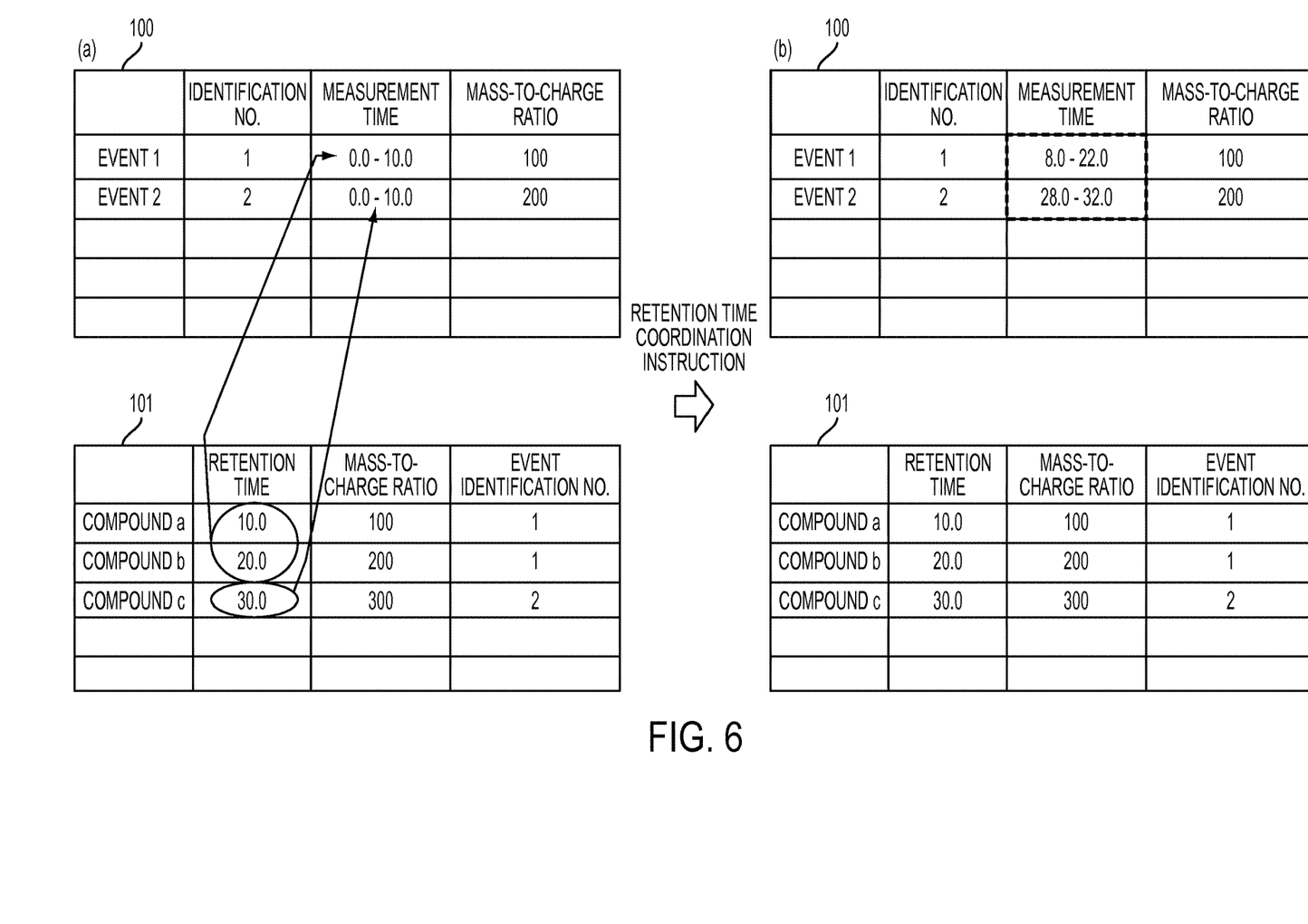
FIG. 6 is a schematic diagram showing changes in the table content when performing time coordination between the analysis condition setting table and the compound information table.

First, the coordination of time information will be described with reference to FIG. 6. In the example of FIG. 6, the retention time information of each compound in the compound information table 101 is reflected in the measurement time range of the event for which the event identification number associated with each compound is provided in the analysis condition setting table 100. Specifically, when the analyst instructs the coordination of the time information with the input part 7 on a separation menu screen not shown in the drawing, the analysis/analytical information management part 51 uses the retention time of each compound in the compound information table 101 determined at that point in time as a reference and adds a preset time margin to form a measurement time range and then rewrites the measurement time range of the event designated by the identification number. Here, a time margin of ±2 minutes around the reference time is predetermined. Accordingly, in the example of FIG. 6, the retention time of compound c, for example, is "30 minutes," so the measurement time range including the time margin is "28 to 32 minutes," and the measurement time range for event 2, which has an identification number of "2," is set to "28 to 32 minutes."

If the same event identification number is set for a plurality of compounds in the compound information table 101, the measurement time range should be set so that all of the retention times of the plurality of compounds are included. Data for which data analysis can be reliably performed for the compounds to be analyzed can be collected in the manner described above.

Figure 7:
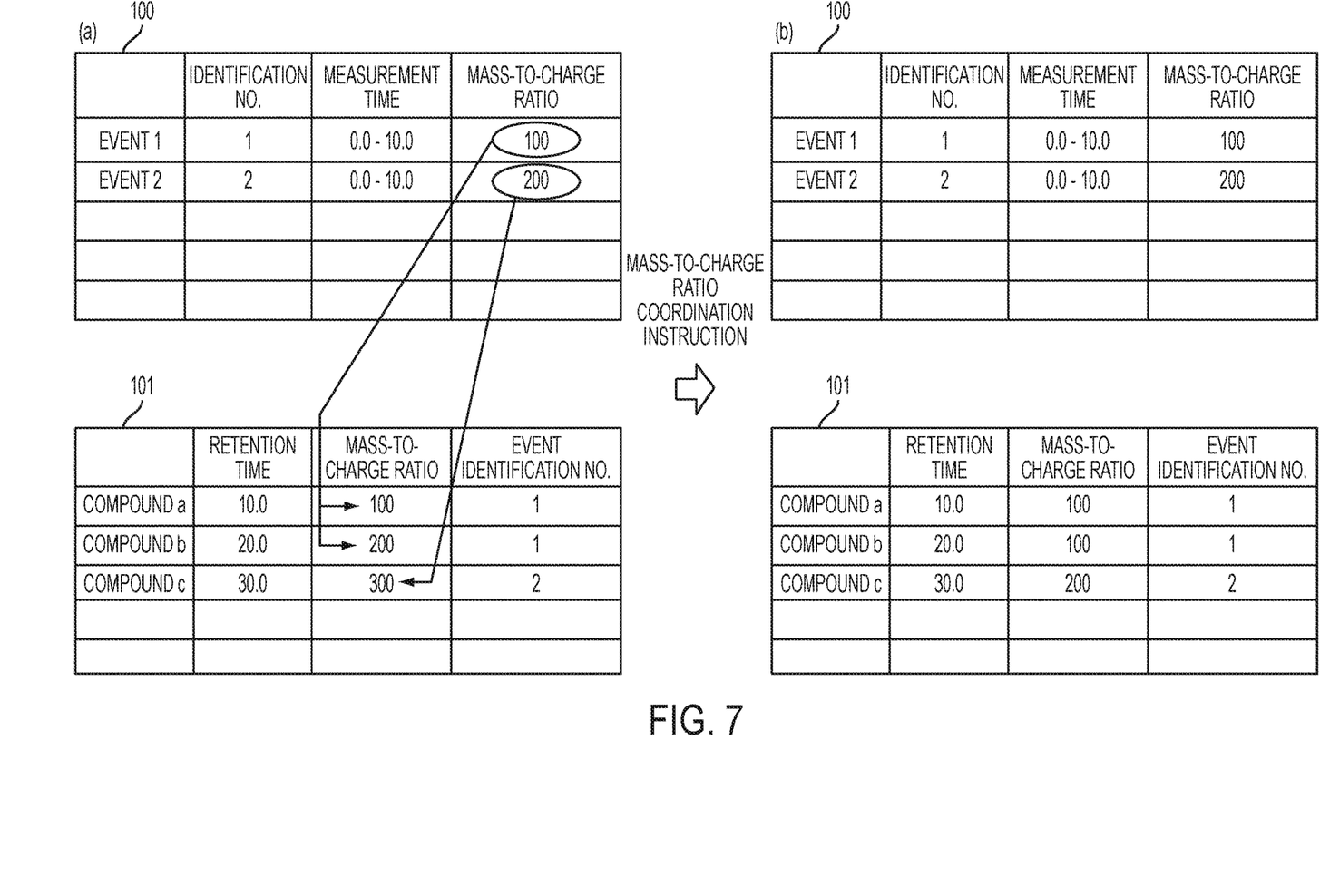
FIG. 7 is a schematic diagram showing changes in the table content when performing mass-to-charge ratio coordination between the analysis condition setting table and the compound information table.

Next, the coordination of mass-to-charge ratios will be described with reference to FIG. 7. In the example of FIG. 7, the mass-to-charge ratio information of each event in the analysis condition setting table 100 is reflected in the mass-to-charge ratio of the compound for which the identification number corresponding to each event is set in the compound information table 101. Specifically, when the analyst instructs the coordination of mass-to-charge ratio information with the input part 7 on a separate menu screen not shown in the drawing, the analysis/analytical information management part 51 extracts the mass-to-charge ratio of each event in the analysis condition setting table 100 which is determined at that point in time and rewrites the mass-to-charge ratio of the compound designated by the event identification number. In the example of FIG. 6, the mass-to-charge ratio of event 2 which has an identification number of "2," for example, is "200," so the mass-to-charge ratio of compound c having an event identification number of "2" is changed from "300" to "200."

If the same event identification number is registered for a plurality of compounds, the same mass-to-charge ratio should be set for the plurality of compounds. If a plurality of mass-to-charge ratios are set for a single event, as shown in FIG. 4 (a), one of the mass-to-charge ratios (an arbitrary mass-to-charge ratio or an mass-to-charge ratio selected in accordance with a predetermined algorithm such as the smallest mass-to-charge ratio) should be selected and set. The mass-to-charge ratios set as analysis conditions may also be used at the time of data analysis in the manner described above.

Of course, the coordination of the time information or the mass-to-charge ratio information between the analysis condition setting table 100 and the compound information table 101 described above need only be performed when required by the analyst, so in a state in which such coordination is not performed, the time information or the mass-to-charge ratio information of both of the tables 100 and 101 is set completely independently and can be arbitrarily set by the analyst.

In the above explanation, a case in which it is presumed that SIM measurements are performed with the MS 2 and the analysis conditions are set as events was given as an example, but the same technology can also be applied to cases in which the MS 2 is a triple quadrupole mass spectrometer and the conditions for MRM measurements are set as events. That is, in MRM measurements, a set comprising a mass-to-charge ratio of precursor ions and a mass-to-charge ratio of product ions form a single analysis condition, so this set of mass-to-charge ratios should replace the mass-to-charge ratios in FIG. 2 or FIG. 4 (a).

In addition, the embodiment described above shows an example in which the present invention was applied to an LC-MS, but the chromatograph part is not particularly limited to a liquid chromatograph, so it is clear that the present invention can also be applied to a GC-MS. Moreover, it is also clear that any variations, modifications, or additions appropriately made to other descriptions within a scope conforming to the gist of the present invention are also included in the scope of the patent claims of this application.

EXPLANATION OF REFERENCES

1 . . . liquid chromatograph (LC)
2 . . . mass spectrometer (MS)
3 . . . personal computer (PC)
4 . . . data processing part
5 . . . control part
51 . . . analysis/analytical information management part
6 . . . storage part
61 . . . measurement data storage region
62 . . . compound information storage region
63 . . . analysis information storage region
7 . . . input part
8 . . . display part

What is claimed is:

1. A chromatograph mass spectrometer, comprising:
a chromatograph part configured to temporally separate various constituents in a sample;
a mass spectrometry part configured to execute mass spectrometry on the constituents separated by said chromatograph part;
an analysis information storage for storing an analysis condition setting table including one or more events for executing mass spectrometry, each event including a measurement time range, one or a plurality of mass-to-charge ratios to be measured within said measurement time range, an event identification number that is unique with respect to each event, and a unique number that is undisplayed, constant, and separate from the event identification number;
a compound information storage for storing a compound information table including a retention time, one or more mass-to-charge ratios, and a compound identification number, the compound identification number being input to correspond to one of the event identification numbers of the events included in the analysis condition setting table;
a display for displaying at least one of an analysis condition table and a compound information table;
a user input interface for receiving a cooperation instruction of a predetermined item, including at least one from among retention time, measurement time, mass to charge ratio, of the analysis condition table or the compound information table;
an analysis information management controller for rewriting information for at least one of the analysis condition setting table and the compound information table based on correspondence between the event identification number and the compound identification number when the cooperation instruction is inputted; and
at least one data processor configured to:
analyze data collected by said mass spectrometry part;
produce said event identification number for each event registered in said analysis condition setting table so as to form sequential numbers in said analysis condition setting table and insert said identification number into an identification number column of said analysis condition setting table;
receive an instruction to coordinate the mass-to-charge ratios in said analysis condition setting table and said compound information table, and in response to the instruction being received to coordinate the mass-to-charge ratios in said analysis condition setting table and the mass-to-charge ratios in said compound information table, coordinate the events in the analysis condition setting table with the compounds in the compound information table using said event identification numbers by modifying the mass-to-charge ratios in the compound information table in accordance with the mass-to-charge ratios in the analysis condition setting table to provide modified mass-to-charge ratios in the compound information table; and analyze data collected by said mass spectrometry part according to the modified mass-to-charge ratios in the compound information table to detect peaks in a vicinity of the retention times corresponding to the modified mass-to-charge ratios in the compound information table whereby a qualitative determination of the compounds in a target sample is provided;
receive an instruction to coordinate the measurement time ranges in said analysis condition setting table and said compound information table, and in response to the instruction being received to coordinate the measurement time ranges in said analysis condition setting table and the retention times in said compound information table, coordinate the events in the analysis condition setting table with the compounds in the compound information table using said event identification numbers by modifying the measurement time ranges in the analysis condition setting table in accordance with the retention times in the compound information table to provide modified measurement time ranges in the analysis condition setting table; and executing mass spectrometry by the mass spectrometry part on the constituents separated by said chromatograph part according to the modified measurement time ranges in the analysis condition setting table, wherein the modified measurement time ranges in the analysis condition setting table comprise all of the retention times of compounds in the compound information table having the same compound identification number; and
receive an instruction to delete an event of the events for executing mass spectrometry listed in the analysis condition setting table, and in response to the instruction being received to delete an event of the events for executing mass spectrometry listed in the analysis condition setting table, deleting the measurement time range, the one or the plurality of mass-to-charge ratios to be measured within said measurement time range, and the event identification number of the event; updating the event identification number of at least one other event of the events for executing mass spectrometry so that the event identification numbers form sequential numbers in said analysis condition setting table; and providing the updated event identification number to a compound in the compound information table that previously included a compound identification number that corresponded to event number that has been updated, and modifying a compound identification number corresponding to the deleted event identification number to a provisional number that is a largest event identification number that is lower than the deleted event identification number.

2. The chromatograph mass spectrometer according to claim 1, wherein the at least one data processor is further configured to define a time range in which a prescribed time range is set based on the retention time set for each compound in the compound information table and to set this as the measurement time range of each event in the analysis condition setting table in response to an instruction being given to coordinate the measurement times in the analysis condition setting table and the compound information table.

3. The chromatograph mass spectrometer according to claim 1, wherein when changes occur in the event identification numbers for events in the analysis condition setting table, the at least one data processor is further configured to update the compound identification number for the compounds in the compound information table based on said unique numbers associated with said events.

4. The chromatograph mass spectrometer according to claim 2, wherein when changes occur in the event identification numbers for events in the analysis condition setting table, the at least one data processor is further configured to update the compound identification number for the compounds in the compound information table based on said unique numbers associated with said events.

5. A method of performing chromatograph mass spectrometry, comprising:
displaying on a screen of a display part:
a first table comprising a first set of parameters for analysis condition setting in which one or a plurality of events are described in a table format in units of events, each event including a measurement time range of a measurement mode, one or a plurality of mass-to-charge ratios to be measured within said measurement time range, an identification number that is unique with respect to the respective event, and a unique number that is undisplayed, constant, and separate from the identification number; and
a second table comprising a second set of parameters for analysis condition setting in which a retention time, one or more mass-to-charge ratios, and an identification number, which is input to correspond to one of said identification numbers for the events in the first table, said identification number for each event are described in a table format in units of compounds to be analyzed by at least one data processor;
producing said identification number for each event registered in said first table so as to form sequential numbers in said table and inserts the numbers into an identification number column of said first table;
receiving a plurality of instructions to coordinate the measurement time ranges in said first table and the retention times in said second table, to coordinate the mass-to-charge ratios in said first table and the mass-to-charge ratios in said second table, and to delete an event of the events for executing mass spectrometry listed in the first table; wherein,
in response to the instruction being received to coordinate the mass-to-charge ratios in said first table and the mass-to-charge ratios in said second table, coordinating the events in the first table with the compounds in the second table using said identification numbers by modifying the mass-to-charge ratios in the second set of parameters in accordance with the mass-to-charge ratios in the first set of parameters to provide a modified second set of parameters and analyzing data collected by said mass spectrometry part according to the modified second set of parameters to detect peaks in a vicinity of the retention times in the modified second set of parameters whereby a qualitative determination of the compounds in a target sample is provided;
in response to the instruction being received to coordinate the measurement time ranges in said first table and the retention times in said second table, coordinate the events in the first table with the compounds in the second table using said identification numbers by modifying the measurement time ranges in the first set of parameters in accordance with the retention times in the second set of parameters to provide a modified first set of parameters; and utilizing a chromatograph part to temporally separate various constituents in a sample; and executing mass spectrometry by a mass spectrometry part on the constituents separated by said chromatograph part according to the modified first set of parameters, wherein the modified measurement time ranges in the first set of parameters comprise all of the retention times of compounds in the second table having the same identification number; and
in response to the instruction being received to delete an event of the events for executing mass spectrometry listed in the first table, deleting the measurement time range, the one or the plurality of mass-to-charge ratios to be measured within said measurement time range, and the identification number of the event; automatically updating the identification number of at least one other event of the events for executing mass spectrometry so that the identification numbers form sequential numbers in said first table; and automatically providing the updated identification number to a compound in the second table that previously included an identification number that corresponded to the updated event, and display part to display the updated identification number such that it is visually clear the identification number has been updated, and modifying a compound identification number corresponding to the deleted event identification number to a provisional number that is a largest event identification number that is lower than the deleted event identification number.

6. The method of performing chromatograph mass spectrometry according to claim 5, further comprising defining a time range in which a prescribed time range is set based on the retention time set for each compound in the second table and to set this as the measurement time range of each event in the first table in response to an instruction being given to coordinate the measurement times in the first and second tables.

7. The method of performing chromatograph mass spectrometry according to claim 5, wherein when changes occur in the identification numbers for events in the first table, updating the identification number for the compounds in the second table based on said unique numbers associated with said events.

8. The method of performing chromatograph mass spectrometry according to claim 6, wherein when changes occur in the identification numbers for events in the first table, updating the identification number for the compounds in the second table based on said unique numbers associated with said events.

9. The chromatograph mass spectrometer according to claim 1, wherein, in response to the instruction being received to delete an event of the events for executing mass spectrometry listed in the analysis condition setting table, the display displays the updated event identification number such that it is visually clear the event identification number has been updated.

* * * * *